US005128106A

United States Patent [19]

Buschmann et al.

[11] Patent Number: 5,128,106

[45] Date of Patent: Jul. 7, 1992

[54] LAMP WITH AN OXYGEN DETECTOR

[75] Inventors: Jeffrey P. Buschmann, Lexington; Arnold E. Westlund, Jr., Winchester, Ky.

[73] Assignee: GTE Products Corporation, Danvers, Mass.

[21] Appl. No.: 552,954

[22] Filed: Jul. 12, 1990

[51] Int. Cl.[5] .............................................. G01D 11/26

[52] U.S. Cl. ...................................... 422/119; 422/86; 422/87; 422/94; 313/552; 313/557; 313/558; 313/562; 445/3; 116/206; 73/31.05; 73/5.2; 73/49.3

[58] Field of Search ........................ 422/83, 86, 87, 94, 422/119, 98; 313/552-562, 25; 445/3; 73/49.3, 52, 31.05; 116/206

[56] References Cited

U.S. PATENT DOCUMENTS

| | | | |
|---|---|---|---|
| 2,489,261 | 11/1949 | Braunsdorff . | |
| 3,626,742 | 12/1971 | Hogan et al. . | |
| 4,127,790 | 11/1978 | Kuus et al. . | |
| 4,450,428 | 5/1984 | Ohta et al. | 422/98 |

*Primary Examiner*—Jill A. Johnston
*Assistant Examiner*—Lyle A. Alexander
*Attorney, Agent, or Firm*—William E. Meyer

[57] ABSTRACT

An oxygen detector for use in a double envelope lamp is described. The detector may be formed by nitriding a metal surface to produce a metal piece with a first visual color or state. The surface thickness is sufficient to exclude oxygen during normal assemble, but thin enough to change colors during lamp operation if oxygen is present.

12 Claims, 1 Drawing Sheet

LAMP WITH AN OXYGEN DETECTOR

TECHNICAL FIELD

The invention relates to electric lamps and Particularly to electric lamps enclosed in an outer envelope. More particularly the invention is concerned with an oxygen detector positioned in an outer envelope of an electric lamp.

BACKGROUND ART

Slow leakers are a persistent problem in lamp manufacture. A slow leaker allows oxygen to seep into the enclosed lamp cavity to destroy the seals or filaments. The lamp then fails. A typical leaker has a life that is about 4% of the lamp's rated life. Some lamps are commonly enclosed in an outer jacket to protect the light generating capsule. The outer jacket may act as a simple shield, or may include a reflector, and lens structure to direct the light generated by the inner capsule. In either case, the enclosed volume is filled with a non-oxygen gas to protect the inner capsule. Nonetheless, oxygen may still enter the enclosed volume, either due to a mistake in the original filling and sealing, or because of leaks in the outer envelope.

For high output lamps, for example studio lamps, costly capsules, reflectors, coatings, lens, and bases are all brought together in one expensive product. If the lamp leaks and fails prematurely, the customer is naturally unhappy. There is then a need for identifying lamps that may be leakers before they are shipped to customers.

Zirconium, and other metal combinations are known to getter evaporating or outgasing materials that may cloud the lamp, or may interfere with the lamp chemistry. Getters are designed to control the materials, and the by products of the original lamp manufacture. Getters are not usually designed to absorb the gases infiltrating through leaks, nor are getters usually designed to accommodate improperly filled lamps. In either case, a common getter has only a small capacity for absorbing stray materials, and would likely be overwhelmed by improper fills, and leaked gases. Also, while a getter may be effective at trapping an improper material, getters usually operate over an extended period of time, and not within the short testing period available in an assembly line. There is then a need to rapidly indicate an improper fill or leak in a sealed lamp. Examples of the prior art are shown in U.S. Pat. Nos. 2,203,896, 2,203,897, 3,626,229, 3,805,105, 3,926,832, 4,200,460, 4,624,520.

U.S. Pat. No. 2,203,896 issued to Jan H. de Boer shows an incandescent lamp with two zirconium getters. One getter is designed to absorb hydrogen products, and the other is designed to absorb oxygen.

U.S. Pat. No. 2,203,897 issued to Antonius de Graaff shows an incandescent lamp bulb enclosing a gas fill including nitrogen. A zirconium getter is used, but limited for operation from 200° C. to 600° C. The zirconium then acts as a getter for hydrogen and hydrogen products.

U.S. Pat. No. 3,626,229 issued to Henry S. Spacil shows an arc discharge capsule positioned in an outer envelope. A zirconium getter is placed in the enclosed volume as a hydrogen getter.

U.S. Pat. No. 3,805,105 issued to Warren C. Gungle shows an arc discharge capsule positioned in an outer envelope. A zirconium getter is placed in the enclosed volume as a hydrogen getter. The getter is specially positioned to maintain its temperature of operation.

U.S. Pat. No. 3,926,832 issued to Aldo Barosi shows a gettering structure composed of metal powders, including zirconium. The porosity of the metal structure enhances the getter.

U.S. Pat. No. 4,200,460 issued to Leonard N. Grossman shows a getter composed of zirconium, nickel and titanium. The getter is able to absorb water, carbon dioxide, oxygen and others gases.

U.S. Pat. No. 4,127,790 issued to Gijsbert Kuus shows an arc discharge lamp with a getter including zirconium among other metals.

U.S. Pat. No. 4,624,520 issued to Anton J. Bouman shows an arc discharge lamp with a zirconium interrupt switch positioned between the inner capsule and outer envelope. If the outer capsule is broken, the zirconium switch oxidizes, causing the switch to open and extinguish the lamp.

DISCLOSURE OF THE INVENTION

An oxygen detector for use in an electric lamp may be formed from a metal base with a nitride surface with a first visual state displaceable by oxygen to produce a second visual state. The nitride surface may be made sufficiently thick to inhibit oxidation of the metal during normal lamp assembly, and may be made thin enough to change visual states after lamp assembly.

A lamp using an oxygen detector may be formed with an outer envelope having an exterior surface, an interior surface defining an enclosed volume ordinarily not containing oxygen, and a seal. Positioned in the enclosed volume is an inner lamp capsule having a means for producing light from electricity, a first lead extending from the inner lamp capsule through the enclosed volume and the outer envelope seal for electrical connection, and a second lead extending from the inner lamp capsule through the enclosed volume and the outer envelope seal also for electrical connection. An oxygen detector is positioned in the enclosed volume having a metal base, an initial nitride surface with a first visual state displaceable by oxygen to produce a second visual state.

BEST MODE FOR CARRYING OUT THE INVENTION

Figure 1:
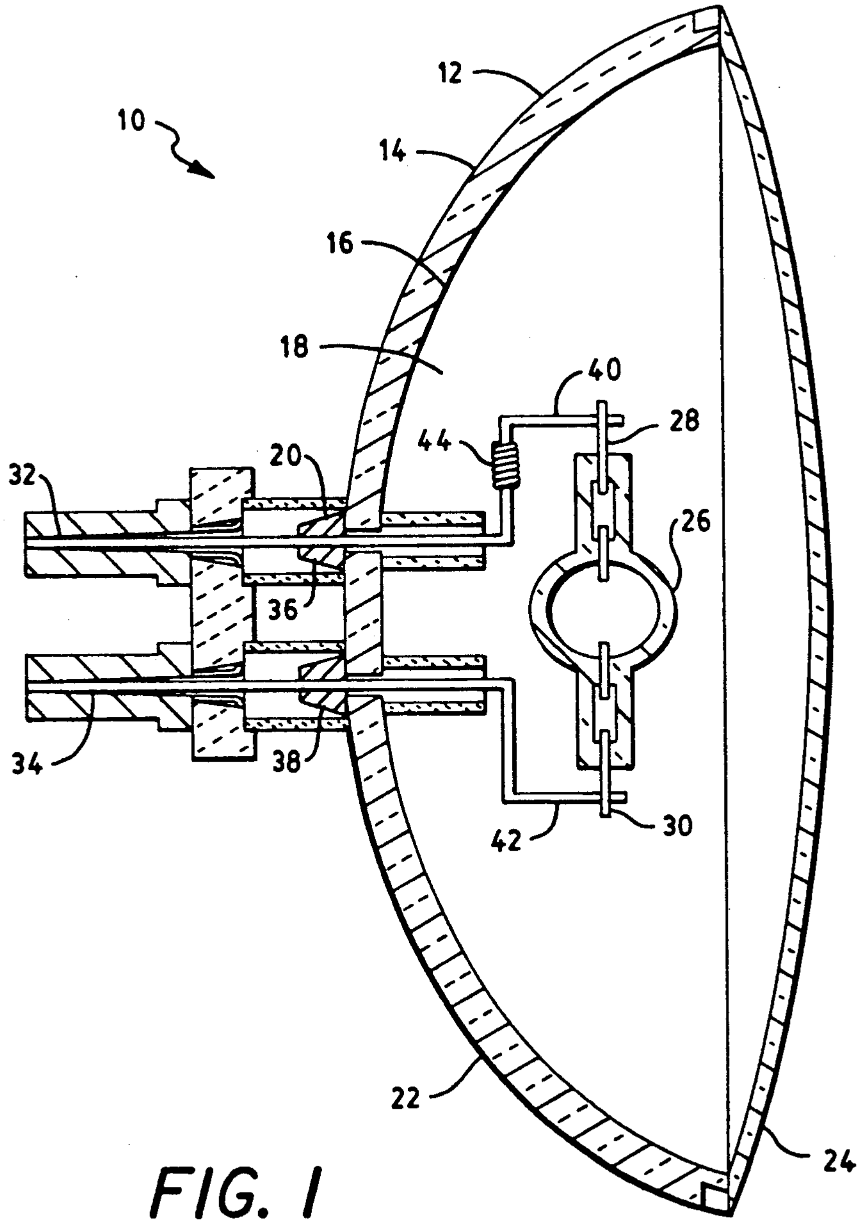
FIG. 1 shows a cross sectional view of a preferred embodiment of a lamp with an oxygen detector.

FIG. 1 shows a cross sectional view of a preferred embodiment of a lamp 10 with an oxygen detector 44. The lamp with an oxygen detector 44 may be assembled from an outer envelope 12, an inner lamp capsule 26, a first support rod 40, a second second support rod 42, and an oxygen detector 44.

The outer envelope 12 has a wall 14 with an interior surface 16 defining an enclosed volume 18, and a seal 20. In the preferred embodiment, the outer envelope 12 is formed from a light transmissive material, such as quartz or glass, and has the shape of a paraboloidal shell. The shell may be aluminized or dichroically coated to form a reflector 22. Positioned across, and sealed to an end of the reflector 22 may be a lens 24. The enclosed volume 18 is then defined by the reflector 22 and lens 24. By way of example an outer envelope 12 is shown as a PAR lamp with an enclosed capsule 26, but it may be of any other suitable double envelope configuration.

The outer envelope 12 encloses the inner lamp capsule 26. The capsule 26 has a means for producing light from electricity. The capsule 26 may then be an incandescent lamp, an arc discharge lamp, or may be any other electric lamp type. In the preferred embodiment, the capsule 26 is a double ended arc discharge lamp capsule with a spherical arc volume. One end of the capsule 26 is press sealed to a first lamp lead 28. An opposite end of the capsule 26 may be similarly press sealed to a second lamp lead 30. Although the capsule 26 is shown as a double ended arc discharge capsule, a single ended, filamented or other light source may be used with the oxygen detector 44.

The outer envelope 12 receives a first input 32 and a second input 34 for electrical power. In the preferred embodiment, first input 32 and second input 34 are brazed respectively to a first ferrule 36 and a second ferrule 38 type seals formed on the back of the reflector. Brazed to the opposite sides of the first ferrule 36 and second ferrule 38 are, respectively, a first support rod 40 and a second support rod 42. In the preferred embodiment, the first support rod 40 has an insulating sleeve covering a portion of the support rod 40 between the outer envelope 12 and the capsule 26. The second support rod 42 may have a similar insulating sleeve. By way of example first support rod 40 and a second support rod 42 are shown as a stiff nickel wires with two right angle bends. The capsule 26 may be supported by and electrically connected to a first support rod 40, and a second support rod 42. The first end of the capsule 26 is then welded to an exposed end of the first support rod 40. The second end of the capsule 26 is similarly connected to an exposed end of the similarly shaped second support rod 42. Other convenient, or suitable lead, support rod, and coupling configuratings may be used.

Figure 2:
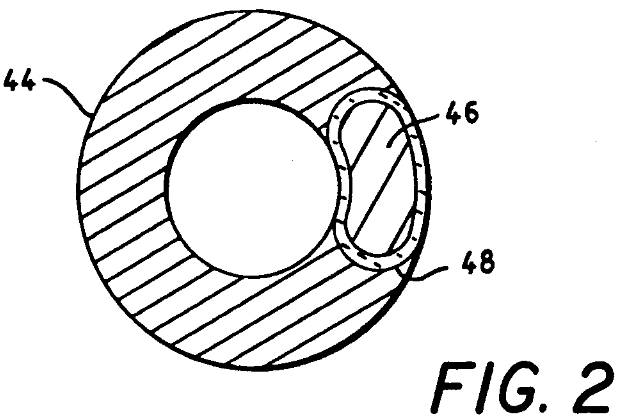
FIG. 2 shows a cross sectional, axial, view of a preferred embodiment of an oxygen detector.

The outer envelope 12 encloses the oxygen detector 44. FIG. 2 shows an example of a conveniently formed oxygen detector 44. FIG. 2 shows a cross sectional, axial, view of a preferred embodiment of an oxygen detector. The preferred oxygen detector 44 has a metal base 46, a nitride surface 48, with a first visual state. The nitride surface 48 protects the metal base 46 from reacting with oxygen at low temperatures, and delays the oxidation of the oxygen detector's surface during normal assembly procedures. The oxygen detector 44 may then be processed by ordinary means during lamp assemble without indicating the presence of oxygen by a change in visual states. The nitrogen of the nitride surface 48 is displaceable by oxygen at an elevated temperature to produce a second visual state. In particular, the preferred metal base 46 is zirconium, or a zirconium alloy that has received a nitride surface 48. Zirconium when nitrided has a gold color, which then comprises a first visual state. When the nitride surface is displaced by oxygen at an elevated temperature, as in an operating lamp, the gold colored zirconium nitride tarnishes and with enough oxygen finally turns black, thereby comprising a second visual state.

The nitride surface 48 should have a depth sufficient to clearly indicate a first visual state. The nitride surface should have a thickness not so great as to require an extended period in the presence of oxygen before changing visual states to indicate the presence of oxygen. The depth of the layer should be sufficient to shield the zirconium from the oxygen present during the normal lamp assembly, and relatively little thereafter. After normal assemble, the nitride surface 48 should be thin enough to be readily displaced by any oxygen that is improperly present in the assembled lamp. A surface depth of a few atomic layers is felt to be sufficient to indicate the first visual state, while easily converted to the second visual state in the presence of oxygen. A depth of from 1.0 microns to 4.0 microns is thought to be most useful, with the preferred range from about 2.0 microns to 3.0 microns.

The oxygen detector 44 may be positioned anywhere in the enclosed volume 18 and supported by a convenient means. The preferred form of the oxygen detector 44 is a coil of zirconium wire firmly positioned around one of the support rods prior to final lamp assembly. The oxygen detector should be placed in a region that is sufficiently hot so the nitrided surface is displaced by any oxygen present. Positioning the oxygen detector near the light source conveniently assures the oxygen detector is properly heated. A zirconium coil oxygen detector is quite flexible, and may be easily slipped over a support rod for the capsule. A zirconium coil is even flexible enough to slide around right angle bends made in the support rod. The support rod with the zirconium coil may then be assembled into the lamp by ordinary procedures. While the preferred form of the oxygen detector is a coil positioned around a support rod, numerous alternative structures are possible. It is only necessary that the oxygen detector be present in enclosed volume. The particular form, and place of attachment for the oxygen detector are a matter of convenience. For example, the oxygen detector may be a tack welded flag, a crimped on strip, or a twisted on wire.

The lamp may be assembled in several different sequences. For the preferred oxygen detector, a zirconium coil is baked in a nitrogen atmosphere at about 1050° C. for fifteen minutes. The temperature and time are chosen to sufficiently clean the zirconium, and nitride the surface to a gold color. The support rod is then properly bent, and a ceramic insulator is then slipped over the support rod. The gold colored zirconium coil is then slipped over the bent support rod. A second support rod is similarly shaped and covered by a ceramic insulator.

For the preferred lamp structure, holes are made in the back of the reflector 22 and then seal by ferrule type seals 36, 38. The first support rod 40 with the zirconium coil 44 and ceramic insulator is brazed to the inside of the first reflector ferrule 36. The second support rod is similarly brazed in place to a second reflector ferrule 38. The capsule 26 may then be aligned in the reflector 22. The leads 28, 30 for the capsule 26 are then welded respectively to the exposed ends of the first and the second support rods 40, 42. The reflector 22 is then melt sealed with a lens 24. The gases in the enclosed volume 18 may be exhausted through a tube and replaced with an non-oxygen gas, such as nitrogen. The exhaust tube is then seal.

In any case the outer envelope 12 is then close, and the enclosed volume 18 includes the oxygen detector 44 with a nitride surface 48 in a non-oxygen gas fill. Non-oxygen fills that are appropriate include argon, nitrogen, neon, xenon, krypton, and other gases that are inert with respect to the outer envelope 12, the capsule 26, and the lamp leads. The lamp is then lit and aged. If the lamp was improperly filled, so as to include oxygen, or if the lamp has a sufficient leak, the oxygen detector 44 is exposed to the detrimental oxygen included in the enclosed volume 18. The oxygen displaces the nitrogen of the nitride surface 48 during the heat generated in the lamp light up for aging. The gold surface of the nitrided zirconium then changes colors from its first visual state, to a tarnished gold, or black, a second visual state, depending on the amount of oxygen present in the enclosed volume 18. After lamp aging, a process following assembly to test lamp functions, inspection of the oxygen detector 44 can be made through the outer envelope 12. If the oxygen detector 44 is in its original, first visual state, the lamp is passed to shipping. If the oxygen detector has changed color, to a second visual state, the lamp is rejected.

In two working example some of the dimensions were approximately as follows: 1200 watt PAR 64 and 575 watt PAR 46 lamps were constructed with an oxygen detector positioned in the outer envelope. The oxygen detector was a zirconium coil formed from a wire 0.279 millimeters (0.011 inches) in diameter, and 148.1 millimeters (5.83 inch) long. The coil had an inside diameter of 1.473 millimeter (0.058 inch), and was 10.16 millimeters (0.4 inch) long. The zirconium coil was heated to 1050° C. in a nitrogen atmosphere for about fifteen minutes. The oven processing cleaned the zirconium coil and deposited a nitride layer about three or four microns thick. The zirconium coil had a gold color. The nitrided coil was slipped over a nickel support rod with a diameter of 2.54 millimeters (0.1 inch). The nickel support rod also functioned as an electrical lead for the inner capsule. The support rod was then brazed in place in a parabolic reflector for electrical through connection. The inner capsule was then mounted to the two support rods. A lens was placed across the open end of the reflector body and melt sealed to the reflector. During the melt sealing, the nitrided zirconium coil was subjected to a high temperature, and a significant oxygen level. If the zirconium coil had not been nitrided, the coil would have rapidly oxidized, turning black in the process. Once the lamp was sealed, the gases in the enclosed volume were exhausted through a tube, and replaced by a nitrogen fill gas at about 550 torr. The lamp was then aged for one hour at its rated wattage. The visual state of the zirconium coil was then checked. If the coil had turned black, it was found that significant amounts of oxygen were present in the enclosed volume. The oxygen causes oxidation and then over heating and failure of the seals for the inner capsule. An additional advantage of the present structure, is that the zirconium getters the small amount of oxygen that outgases from the braze between the support rods and reflector ferrules. The disclosed dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. An oxygen detector enclosed in a portion of an electric lamp containing a means of producing light from electricity, the detector comprising a zirconium base, a nitride surface with a first visual state displaceable by oxygen to produce a second visual state to thereby indicate the presence of oxygen.

2. The oxygen detector of claim 1, wherein the base is formed from a zirconium alloy.

3. The oxygen detector of claim 1, wherein the nitride surface has a depth sufficient to exclude oxygen during assembly procedures.

4. The oxygen detector of claim 1, wherein the nitride surface has a depth less than an amount that excludes oxygen in a lamp during lamp operation from reacting with the metal base.

5. The oxygen detector of claim 4, wherein the nitride surface has a depth of from 1 to 4 microns.

6. A lamp with an oxygen detector comprising:

a) an outer envelope having a wall with an interior surface defining an enclosed volume not containing oxygen, and a seal,
b) an inner lamp capsule, positioned in the enclosed volume, having a means for producing light from electricity,
c) a first lead extending from the inner lamp capsule through the enclosed volume and through the outer envelope seal for electrical connection,
d) a second lead extending from the inner lamp capsule through the enclosed volume and through the outer envelope seal for electrical connection, and
e) an oxygen detector positioned in the enclosed volume having a zirconium base, a nitride surface with a first visual state displaceable by oxygen at the temperature of lamp operation to produce a second visual state to thereby indicate the presence of oxygen.

7. The lamp in claim 6, wherein the base is formed from a zirconium alloy.

8. The lamp in claim 7, wherein the zirconium has a sufficiently deep nitride layer to yield a gold color as a first visual state.

9. The lamp of claim 6, wherein the nitride surface has a depth sufficient to exclude oxygen during assembly procedures.

10. The lamp of claim 6, wherein the nitride surface has a depth thin enough to be displaced by oxygen in a lamp during lamp operation and thereby change visual states.

11. The lamp of claim 10, wherein the nitride surface has a depth of from 1 to 4 microns.

12. The lamp of claim 11, wherein the nitride surface has a depth of from 2 to 3 microns.

* * * * *